United States Patent [19]

Iwasawa et al.

[11] 3,919,350
[45] Nov. 11, 1975

[54] POWDER COATING COMPOSITIONS

[75] Inventors: Naozumi Iwasawa; Minoru Shibata; Tadashi Watanabe; Ichiro Yoshihara, all of Hiratsuka, Japan

[73] Assignee: Kansai Paint Company, Ltd., Japan

[22] Filed: May 29, 1973

[21] Appl. No.: 364,538

[30] Foreign Application Priority Data

May 31, 1972  Japan................................ 47-54550
May 31, 1972  Japan................................ 47-54553

[52] U.S. Cl. ........... 260/850; 260/42.29; 260/42.37; 260/42.44; 260/67.6 R; 260/249.6; 260/856; 428/457; 428/460
[51] Int. Cl.² ................. C08L 61/20; C08L 67/00
[58] Field of Search..... 260/850, 249.6, 856, 67.6 R

[56] References Cited
UNITED STATES PATENTS

| | | | |
|---|---|---|---|
| 3,160,608 | 12/1964 | Polansky et al. | 260/249.6 |
| 3,428,479 | 2/1969 | Dobransky | 260/856 |
| 3,471,388 | 10/1969 | Koral | 260/856 |
| 3,806,480 | 4/1974 | Leonard | 260/850 |

OTHER PUBLICATIONS

"Powder Coating: Why–How–When," Jour. of Paint Technology, Vol. 44, Feb. 1972, pp. 30–37.

*Primary Examiner*—Murray Tillman
*Assistant Examiner*—J. Ziegler
*Attorney, Agent, or Firm*—Larson, Taylor and Hinds

[57] ABSTRACT

Powder coating composition comprising 4 to 20% by weight of a hexamethylolmelamine derivative and 96 to 80% by weight of a polyester having a softening point of 65° to 130°C, an acid value of 5 to 20 and an excess hydroxyl percentage of 5 to 30%, said hexamethylolmelamine derivative being at least one of etherified products of hexamethylolmelamine, the average total number of the CH₃O— and RO— groups being 5.5 to 6.0 per melamine nucleus, the average number of the RO— group being 0.5 to 3.0 permelamine nucleus, wherein RO is

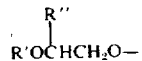

group or

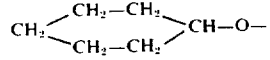

group. R' being an alkyl group having 1 to 4 carbon atoms and R'' being hydrogen atom or methyl group.

10 Claims, No Drawings

POWDER COATING COMPOSITIONS

This invention relates to a powder coating composition, more particularly to an improved thermosetting powder coating composition containing a specific melamine derivative and a polyester.

Thermosetting powder coating compositions containing a polyester and a melamine derivative, namely "melamine-polyester", have already been known. Used as the melamine derivative in the composition is a hexakisloweralkoxymethylmelamine obtained by etherifying hexakismethylolated melamine with a lower alcohol. Further used as the polyester is one having free hydroxyl groups, since it is necessary to bake the powder coating composition to subject the polyester and melamine to crosslinking.

The conventional powder coating composition incorporating the melamine-polyester is of poor curing properties and, when baked at a usual temperature of about 160° to 170°C, it gives a coating film which is poor in flexibility and in solvent resistance. Accordingly, the coating composition must be baked at a temperature at least about 40° to 50°C higher than the usual baking temperature. However, the high-temperature baking is not only disadvantageous from the viewpoint of heat economy but also has the serious drawback of being unapplicable to soldered products since the solder will be melted during baking. In fact, it has the fatal drawback that it is almost unapplicable to automotive components. Moreover, during baking, the coating film incorporating the melamine-polyester gives off a gas which tends to form vents when escaping from the coating film that has been rendered highly viscous, giving rise to so-called "popping". The susceptibility to popping makes it impossible to apply the coating composition to a great thickness and lowers the smoothness of the coating film obtained.

To prevent the occurrence of popping, it has been known to use a mixed product obtained by etherifying hexamethylolmelamine with a mixture of lower and higher aliphatic alcohols. According to this method, the occurrence of popping reduces as the length of chain of the higher alcohol used increases, but the resistance to "blocking" lowers with the increase in the length of chain thereof. The term "blocking" means that particles in the coating composition coheres one another during storage. Consequently, if the occurrence of popping is reduced to a satisfactory extent, the resistance to blocking will be deteriorated markedly, rendering the powder coating composition almost unapplicable to practical use. In addition, the use of such melamine derivative impairs the resistance to solvent and flexibility, making it still necessary to bake the composition at a high temperature of at least 200°C.

An object of this invention is to provide a powder coating composition from which coating films having excellent solvent resistance and flexibility can be formed at a usual baking temperature.

Another object of this invention is to provide a powder coating composition having excellent curing properties.

Another object of this invention is to provide a powder coating composition which is not susceptible to the occurrence of popping.

Another object of this invention is to provide a powder coating composition which can be applied to a great thickness.

Another object of this invention is to provide a powder coating composition capable of forming a coating film having excellent surface smoothness.

Another object of this invention is to provide a powder coating composition having an excellent resistance to blocking.

Still another object of this invention is to provide a powder coating composition which can be applied, free of any trouble, to soldered materials, especially to automotive components.

These and other objects of this invention will be apparent from the following description.

The objects of this invention can be accomplished by using, in place of the conventional melamine derivatives, a specific modified melamine conjointly with polyester in a specified proportion.

The present invention provides a powder coating composition comprising 4 to 20% by weight of a hexamethylolmelamine derivative and 96 to 80% by weight of a polyester having a softening point of 65° to 130°C and an acid value of 5 to 20 and an excess hydroxyl percentage of about 5 to 30%, said hexamethylolmelamine derivative being at least one of etherified products of hexamethylolmelamine which have $CH_3O-$ and $RO-$ groups substituted for the hydroxyl group in the methylol group of hexamethylolmelamine, the average total number of the $CH_3O-$ and $RO-$ groups being 5.5 to 6.0 per melamine nucleus, the average number of the $RO-O$ group being 0.5 to 3.0 per melamine nucleus, wherein R is

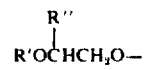

group or

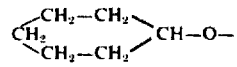

group, R' being an alkyl group having 1 to 4 carbon atoms and R" being hydrogen atom or methyl group.

The present powder coating composition containing the above specific hexamethylolmelamine derivative and polyester can be applied to any desired thickness and easily cured at a usual baking temperature without any occurrence of popping to produce a smooth-surfaced coating film which is excellent in solvent resistance, in flexibility and in resistance to blocking.

The etherified products of hexamethylolmelamine to be used according to this invention must be those having the above-specified substituents in the specified range of number in the melamine nucleus. For instance, if the average total number of $CH_3O-$ and $RO-$ groups per melamine nucleus (R being the same as defined before) contained in the etherified product is less than 5.5, the resulting composition will not exhibit improved solvent resistance and flexibility and is liable to cause popping during baking operation. Further even in the case where the etherified product contains 5.5 to 6.0 substituted $CH_3O-$ and $RO-$ groups per melamine nucleus on the average, the resulting composition will exhibit poor solvent resistance and low flexibility if the average number of $RO-$ group per melamine nucleus is less than 0.5. If the average number of the $RO-$ group per melamine nucleus is more than 3.0, a low resistance to blocking will result, rendering the powder coating composition ineffective to use.

The etherified products of hexamethylolmelamine to be used in this invention can be prepared by various methods. For example, the etherified product of hexamethylolmelamine is produced easily by subjecting hexakismethoxymethylmelamine with an alcohol having the formula of ROH wrein RO is as defined above to ether exchange reaction.

The alcohols to be used include alkylene glycol monoalkyl ethers having the formula of

(R' and R'' being as defined before) and cyclohexanol having the formula of

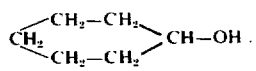

Examples of the alkylene glycol monoalkyl ethers are ethylene glycol monomethyl ether, ethylene glycol monoethyl ether, ethylene glycol mono-n-propyl ether, ethylene glycol mono-iso-propyl ether, ethylene glycol mono-n-butyl ether, ethylene glycol-iso-butyl ether, ethylene glycol mono-sec-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-iso-propyl ether, ethylene glycol mono-sec-butyl ether, etc. The ether exchange reaction can be carried out at a temperature of not higher than 100°C in the presence of a strong acid catalyst such as hydrochloric acid, nitric acid, sulfuric acid, phosphoric acid or the like. After the reaction the unreacted alcohol is removed under a reduced pressure in the presence of a weak alkali. The hexakismethoxymethylmelamine used for the reaction may preferably be pure hexakismethoxymethylmelamine, but it is possible to use a methylether of hexamethylolmelamine having at least 5.5 methoxy groups per melamine nucleus on the average.

The polyesters to be used in this invention can be prepared by polycondensation of a carboxylic acid with a polyhydric alcohol and are those having a softening point of 65° to 130°C, an acid value of 5 to 20 and an excess hydroxyl percentage of about 5 to 30%, preferably those having a softening point of 65° to 115°C, an acid value of 6 to 18 and an excess hydroxyl percentage of 8 to 25%. The softening point as herein referred to is determined according to JIS–K–2513 (ring and ball method). The excess hydroxyl percentage herein used is calculated from the following equation:

$$\text{Excess hydroxyl percentage} = \left[ \left( \frac{\text{Mol number of hydroxyl groups contained in the starting polyhydric alcohol used}}{\text{Mol number of carboxyl groups contained in the starting carboxylic acid used}} \right) - 1 \right] \times 100$$

The use of polyester having a softening point of lower than 65°C reduces the resistance to blocking, whereas those having a softening point higher than 130°C fail to produce smooth surfaced coating film. Further if the acid value of the polyester to be used is below 5, the resulting coating will be low in flexibility, solvent resistance and curing properties. Conversely, if it is higher than 20, the particles of the composition will be melted, permitting curing reaction to take place before the coating film is formed, impairing the fluidity of the film and making it impossible to obtain a coating film having smooth and glossy coating surface. In addition, popping will occur markedly. If the excess hydroxyl percentage of the polyester to be used is less than 5%, the absolute number of the crosslinkable functional groups is insufficient, which deteriorates the curing properties of the coating film. Conversely, if it is more than 30%, the compatibility of the resin with alkyletherified methylolmelamine will be impaired and the coating formed will be low in flexibility and gloss.

Usable as the polyester according to this invention are a wide variety of polyesters produced by the polycondensation of carboxylic acids with polyhydric alcohols, insofar as their softening point, acid value and excess hydroxyl percentage are within the ranges specified above. Examples of the carboxylic acid to be used in this invention are benzene-1,2,4-tricarboxylic acid, phthalic acid, tetrahydrophthalic acid, hexahydrophthalic acid, endobicyclo- 2,2,1 -5-heptyne-2,3-dicarboxylic acid, tetrachlorophthalic acid, succinic acid, isophthalic acid, terephthalic acid, azelaic acid, adipic acid, sebacic acid, and like carboxylic acids, anhydrides of such acids or alkyl esters thereof.

Effectively usable as the polyhydric alcohol is at least one of dihydric alcohols, trihydric alcohol and higher hydric alcohols. Examples are glycerin, trimethylolpropane, trimethylolethane, trishydroxyethyliso-cyanurate, pentaerythritol, ethylene glycol, diethylene glycol, propylene glycol, trimethylene glycol, 1,3-, 1,2- and 1,4-butanediols, heptanediol, hexanediol, octanediol, 2,2'-bis (4-cyclohexanol) propane, neopentyl glycol, 2,2,3-trimethylpentane-1,3-diol, etc.

The softening point of the resin can be controlled by varying the proportions of the carboxylic acid and polyhydric alcohol. The excess hydroxol percentage can be controlled by suitably selecting the ratio of the dihydric alcohol to the trihydric or higher hydric alcohol in the starting composition or the ratio of the carboxylic acid to the polyhydric alcohol.

The acid value can be controlled by suitably selecting the ratio of the carboxylic acid to the polyhydric alcohol and/or the ratio of the free polycarboxylic acid to the dialkyl ester thereof.

The polyester to be used in this invention can be prepared by a usual method. For example, in the case where carboxylic acid and/or anhydride thereof and polyhydric alcohol alone are used as starting materials, the mixture of these are heated to about 180° to 300°C in the presence or absence of a small amount of solvent which is azeotropic with water to effect dehydration condensation, whereby the desired resin will be obtained. Further if dialkyl ester of dicarboxylic acid is used as carboxylic acid, the dialkyl ester and polyhydric alcohol are heated to 200° to 300°C in the presence of an esterexchange reaction catalyst such as lead monoxide, fatty acid salt or naphthenate of lead, lithium hydroxide, fatty acid salt or naphthenate of lithium or the like to effect ester exchange reaction, and carboxylic acid and/or anhydride thereof are/is added to the product, followed by heating to 180° to 300°C for dehydration condensation, which gives a polyester for use in this invention.

According to this invention, it is essential to conjointly use etherified product of hexamethylolmelamine specified before and the polyester having the properties specified above in the proportion of 4 to 20% by weight of the former to 96 to 80% by weight of the latter, preferably in the ratio of 5 to 15% by weight of the former to 95 to 85% by weight of the latter. If the amount of the etherified product of hexamethylolmelamine is less than 4% by weight, low flexibility and solvent resistance will result. Conversely, if it is over 20% by weight, the particles of the powder coating composition tend to cohere, rendering the powder coating composition no longer serviceable as such.

The powder coating composition of this invention may further incorporate therein usual pigments for coating purposes, anticissing agent, leveling agent, etc. The pigments to be used include coloring pigment and extender pigment. Examples of the coloring pigment are titanium dioxide, lead white, lithopone, zinc white, red iron oxide, red lead, vermillion, cadmium red, molybudenum red, cuprous oxide, chrome yellow, zinc chromate, chrome green, Toluidine Red, copper-Phthalocyanine Blue, copper-Phthalocyanine Green, etc. Examples of the extender pigment are calcium carbonate, talc, clay, etc. Examples of the leveling agent are ester gum, silicon oil, etc.

The powder coating composition of this invention is prepared by a usual method. For example, the etherified product of hexamethylolmelamine, polyester and a suitable solvent are mixed together uniformly, along with pigment, anticissing agent, leveling agent, and the like as desired, at a temperature of about 80° to 140°C, preferably about 90° to 130°C by two or three rolls of the heating type, extruder or like suitable kneader, and the solvent is then removed from the mixture.

Given below are reference examples showing the processes for preparing the etherified product of hexamethylolmelamine and polyester and examples of this invention, in which the parts and percentages are all by weight.

REFERENCE EXAMPLE 1

Preparation of etherified product 1

Into a 1-liter three-necked flask equipped with a stirrer and a device for removing the byproduct of methanol were placed 390 parts (1 mol) of Cymel No. 300 (hexakismethoxymethylmelamine having a purity of 95 to 97% and produced by American Cyanamid Co., same as hereinafter), 295 parts (2.5 mols) of ethylene glycol monobutyl ether and 0.67 part of 60% aqueous solution of nitric acid. The reaction system was progressively heated to a temperature of 60°C and, at the same time, the pressure within the system was reduced to 50 to 60 mm Hg. The mixture was made to react at 60°C for 3 hours while methanol resulting from the reaction as a by-product was being removed. After completion of the reaction, the reaction mixture was neutralized with 30% aqueous solution of caustic soda to a pH of 8.2, and the neutralized liquid was heated to 140°C with the interior of the system maintained at a reduced pressure of 5 mm Hg for concentration to remove the unreacted ethylene glycol monobutyl ether. The resulting concentrate was filtered to remove the neutralized salt and to obtain a reaction product in the form of a transparent consistent liquid (solids: 99.5%), which was found to have a viscosity of R (25°C) by Gardner-Holdt bubble viscometer. To determine the chemical structure of the product, it was decomposed with phosphoric acid and analyzed by gas chromatography. At a result, the product was found to be contained 1.0 butoxyethyl group per melamine nucleus but hardly any free methylol group.

REFERENCE EXAMPLES 2 to 22

Preparation of etherified products 2 to 22

Reactions were conducted in the same manner as in Reference Example 1 using the compositions listed in Table 1 below to prepare etherified products 2 to 22. The reaction temperature and reaction time were as given in Table 1, which also shows the properties of the etherified products obtained.

The etherified products 1 to 10 in Table 1 are all alkyletherified methylolmelamines prepared by subjecting Cymel No. 300 and ethylene glycol monoalkyl ether to ether exchange reaction. Among these, the etherified products 1 to 5, and the etherified products 7 to 9 are alkyletherified methylolmelamines according to this invention, whereas the etherified products 6 and 10 are alkyletherified methylolmelamines other than those of this invention (comparison samples). But these 6 and 10 can be used in this invention in the mixture of the other etherified products. Further the etherified products 11 to 22 are those obtained by etherifying Cymel No. 300 with alcohol (comparison samples).

Table 1

| Material used | Etherified product | | | | | | | | |
|---|---|---|---|---|---|---|---|---|---|
| | 2 | 3 | 4 | 5 | 6 | 7 | 8 | 9 | 10 |
| Cymel No. 300 (parts) | 390 (1 mol) | Same | Same | Same | Same | Same | Same | Same | Same |
| Ethylene glycol mono-methyl ether (parts) | 190 (2.5 mols) | | | | 380 (5.0 mols) | | 76 (1 mol) | | |
| Propylene glycol mono-ethyl ether (parts) | | 265 (2.5 mols) | | | | 450 (5.0 mols) | | 54 (0.6 mol) | |
| Ethylene glycol mono-isopropyl ether (parts) | | | 260 (2.5 mols) | | | | | 52 (0.5 mol) | |
| Propylene glycol mono-butyl ether (parts) | | | | 132 (1.0 mol) | | | | 177 (1.5 mols) | 59 (0.5 mol) |

Table 1-continued

| Material used | Etherified product | | | | | | | | |
|---|---|---|---|---|---|---|---|---|---|
| | 2 | 3 | 4 | 5 | 6 | 7 | 8 | 9 | 10 |
| 60% Nitric acid (parts) | 0.67 | 0.60 | 0.70 | | 3.5 | 2.7 | | | 0.20 |
| 98% Sulfuric acid (parts) | | | | 0.35 | | | | | |
| 35% Hydrochloric acid (parts) | | | | | | | | 1.1 | |
| Phosphoric acid (parts) | | | | | | | 0.75 | | |
| Reaction temperature (°C) | 50 | 55 | 55 | 50 | 60 | 50 | 80 | 50 | 50 |
| Reaction time (hours) | 3.5 | 3.5 | 3.5 | 2.5 | 7.0 | 5.0 | 2.0 | 4.0 | 2.0 |
| Bubble viscosity | U | T | T-S | X | L | O | S | V-U | Z |
| Average number of R″ R′OCHCH$_2$O— group per melamine nucleus | 1.1 | 1.3 | 1.4 | 0.6 | 3.7 | 2.4 | 1.7 | 0.8 | 0.2 |
| Solids (%) | 99.7 | 99.3 | 99.4 | 99.8 | 99.1 | 99.3 | 99.5 | 99.8 | 99.9 |

| Material used | Etherified product | | | | | |
|---|---|---|---|---|---|---|
| | 11 | 12 | 13 | 14 | 15 | 16 |
| Cymel No. 300 (parts) | 390 (1 mol) | Same | Same | Same | Same | Same |
| Ethanol (parts) | 92 (2 mols) | | | | | |
| Isopropanol (parts) | | 150 (2.5 mols) | | | | |
| n-Butanol (parts) | | | 148 (2 mols) | 185 (2.5 mols) | | |
| sec-Butanol (parts) | | | | | 185 (2.5 mols) | |
| Amyl alcohol (parts) | | | | | | 176 (2 mols) |
| Isoamyl alcohol (parts) | | | | | | |
| n-Hexanol (parts) | | | | | | |
| n-Octanol (parts) | | | | | | |
| 2-Ethylhexanol (parts) | | | | | | |
| Lauryl alcohol (parts) | | | | | | |
| 60% Nitric acid (parts) | 0.50 | 0.75 | 0.50 | 0.75 | 0.75 | 0.60 |
| Reaction temperature (°C) | 50 | 50 | 50 | 50 | 50 | 50 |
| Reaction time (hours) | 3.5 | 3.5 | 4.0 | 4.0 | 4.0 | 3.5 |
| Bubble viscosity | Z-1 | W | W | R′ | W | V |
| Average number of RO—group per melamine nucleus | 1.2 | 0.9 | 1.1 | 1.8 | 0.9 | 1.0 |

Table 1-continued

| Material used | Etherified product | | | | | | | | |
|---|---|---|---|---|---|---|---|---|---|
| | 2 | 3 | 4 | 5 | 6 | 7 | 8 | 9 | 10 |
| Solids (%) | 99.9 | 99.8 | 99.8 | 99.5 | 99.7 | 99.7 | | | |

| Material used | Etherified product | | | | | |
|---|---|---|---|---|---|---|
| | 17 | 18 | 19 | 20 | 21 | 22 |
| Cymel No. 300 (parts) | Same | Same | Same | Same | Same | Same |
| (parts) | | | | | | |
| (parts) | | | | | | |
| Isopropanol (parts) | | | | | | |
| n-Butanol (parts) | | | | | | |
| sec-Butanol (parts) | | | | | | |
| Amyl alcohol (parts) | | | | | | |
| Isoamyl alcohol (parts) | 220 (2.5 mols) | | | | | |
| n-Hexanol (parts) | | 204 (2 mols) | | | | |
| n-Octanol (parts) | | | 325 (2.5 mols) | 390 (3.0 mols) | | |
| 2-Ethylhexanol (parts) | | | | | 325 (2.5 mols) | |
| Lauryl alcohol (parts) | | | | | | 465 (2.5 mols) |
| 60% Nitric acid (parts) | 0.80 | 0.75 | 0.75 | 0.85 | 1.05 | 1.25 |
| Reaction temperature (°C) | 55 | 55 | 55 | 55 | 50 | 55 |
| Reaction time (hours) | 3.5 | 3.5 | 3.5 | 4.0 | 3.5 | 4.0 |
| Bubble viscosity | U-V | T | R-S | N | T | Q |
| Average number of RO—group per melamine nucleus | 0.9 | 1.2 | 1.2 | 2.1 | 1.0 | 1.1 |
| Solids (%) | 99.6 | 99.4 | 99.3 | 99.0 | 99.1 | 98.9 |

REFERENCE EXAMPLE 23

Preparation of etherified product 23

Into the same flask as in Reference Example 1 were placed 390 parts (1 mol) of Cymel No. 300, 250 parts (2.5 mols) of cyclohexanol and 0.67 part of 60% aqueous solution of nitric acid. The reaction system was progressively heated to a temperature of 55°C, with the pressure within the system reduced to 50 to 60 mm Hg. The mixture was made to react at 55°C for 5 hours while methanol resulting from the reaction as a by-product was being removed. After completion of the reaction, the reaction mixture was neutralized with 30% aqueous solution of caustic soda to a pH 8.0, and the neutralized liquid was heated to about 140°C with the interior of the system maintained at a reduced pressure of 5 mm Hg for concentration to remove the unreacted cyclohexanol. The resulting concentrate was filtered to remove the neutralized salt and to obtain a reaction product in the form of a transparent consistent liquid (solids: 99.5%), which was found to have a viscosity of Z - 3 (25°C) by Gardner-Holdt bubble viscometer. To determine the chemical structure of the product, it was decomposed with phosphoric acid and analyzed by gas chromatography. At a result, the product was found to be contained 1.0 cyclohexanoxy group per melamine nucleus but hardly any free methylol group.

REFERENCE EXAMPLES 24 to 27

Preparation of etherified products 24 to 27

The same procedure as in Reference Example 23 was followed except for the conditions listed in Table 2 below with respect to the amount of cyclohexanol, kind and amount of acid catalyst, reaction temperature and reaction time, whereby four kinds of etherified products 24 – 27 were obtained. The properties of the products are also listed in Table 2.

Table 2

| Material used and reaction conditions | | Etherified product | | | |
|---|---|---|---|---|---|
| | | 24 | 25 | 26 | 27 |
| Cymel No. 300 (parts) | | 390 (1.0 mol) | Same | Same | Same |
| Cyclohexanol (parts) | | 100 (1.0 mol) | 350 (3.5 mols) | 500 (5.0 mols) | 50 (0.5 mol) |
| Acid cata-lyst | 60% Aq. soln. of nitric acid (parts) | | | 3.0 | 0.2 |
| | 98% Aq. soln. of sulfuric acid (parts) | | 1.7 | | |
| | Phosphoric acid (parts) | 0.5 | | | |
| Reaction temperature (°C) | | 55 | 60 | 60 | 50 |
| Reaction time (hr.) | | 53 | 5 | 55 | 3 |
| Bubble viscosity | | Z – 5 | X | U | Z – 6 |
| Solids (%) | | 99.5 | 99.0 | 99.2 | 99.6 |
| Number of cyclohexanoxy group per melamine nucleus | | 0.6 | 2.6 | 3.5 | 0.2 |

REFERENCE EXAMPLE 28

Preparation of polyester A

Into a reactor equipped with a stirrer, thermomether and separator were placed 194 parts (1.0 mol) of dimethyleterephthalate, 146 parts (1.4 mols) of neopentyl glycol, 174.6 parts (0.9 mol) of dimethylisophthalate, 126 parts (1.4 mols) of 1,3-butylene glycol and 27.6 parts (0.3 mol) of glycerin, and the mixture was melted by heating. The molten mixture was further heated with stirring to a temperature of 160°C, whereupon 1.0 part of lead oleate was added. The mixture was further heated to 240°C and maintained at this temperature for 1 hour. In the meantime, methanol produced as a by-product was removed through the separator. Subsequently, 116.2 parts (0.70 mol) of isophthalic acid and 43.8 parts (0.3 mol) of adipic acid were placed into the reactor, this reducing the temperature to about 180°C. When the temperature reached 240°C again through continuous heating, 30 parts of xylene was slowly added to the resulting mixture. The system was maintained at the same temperature for 2 hours. In the meanwhile, water produced as a by-product was separated from xylene by the separator and removed.

After leaving the reaction system to stand at 240°C for 2 hours, the internal pressure of the reactor was reduced to remove xylene, followed by cooling. While in a fluid state, the contents were taken out.

The resin obtained (hereinafter referred to as "polyester A") had a softening point of 78°C, an excess hydroxyl percentage 12.1% and an acid value of 7.1.

| Reference Example 29 Preparation of polyester B | |
|---|---|
| Dimethylterephthalate | 388 parts (2.0 mols) |
| 1,3-Butylene glycol | 135 parts (1.5 mols) |
| Ethylene glycol | 93 parts (1.5 mols) |
| Trimethylolethane | 36 parts (0.3 mol) |
| Lead octenoate | 1 part |
| Phthalic anhydride | 148 parts (1.0 mol) |

A mixture of the above composition was reacted in the same manner as in Reference Example 28.

The resin obtained (hereinafter referred to as "polyester B") had the following properties:

| | |
|---|---|
| Softening point | 68°C |
| Excess hydroxyl percentage | 15.0% |
| Acid value | 12.4 |

REFERENCE EXAMPLE 30

Preparation of polyester C

| | |
|---|---|
| Dimethylterephthalate | 388 parts (2.0 mols) |
| Neopentyl glycol | 156 parts (1.5 mols) |
| Ethylene glycol | 93 parts (1.5 mols) |
| Pentaerythritol | 13.6 parts (0.1 mol) |
| Litharge | 1 part |
| Isophthalic acid | 132.8 parts (0.8 mol) |
| Sebacic acid | 40.4 parts (0.2 mol) |

A mixture of the above composition was reacted in the same manner as in Reference Example 28.

The resin obtained (hereinafter referred to as "polyester C") had the following properties:

| | |
|---|---|
| Softening point | 75°C |
| Excess hydroxyl percentage | 6.7% |
| Acid value | 15.2 |

REFERENCE EXAMPLE 31

Preparation of polyester D

| | |
|---|---|
| Dimethylterephthalate | 388 parts (2.00 mols) |
| Ethylene glycol | 124 parts (2.00 mols) |
| 1,3-Butylene glycol | 90 parts (1.00 mol) |
| Trimethylolpropane | 67 parts (0.50 mol) |
| Litharge | 1 part |
| Phthalic anhydride | 148 parts (1.00 mol) |
| Adipic acid | 43.8 parts (0.30 mol) |
| Xylene | 30 parts |

A mixture of the above composition was reacted in the same manner as in Reference Example 28.

The resin obtained (hereinafter referred to as "polyester D") had the following properties:

| | |
|---|---|
| Softening point | 88°C |
| Excess hydroxyl percentage | 13.6% |
| Acid value | 17.1 |

REFERENCE EXAMPLE 32

Preparation of polyester E

| | | |
|---|---|---|
| Dimethylterephthalate | 242.5 parts | (1.25 mols) |

| | | | |
|---|---|---|---|
| Neopentyl glycol | 239 | parts | (2.30 mols) |
| Trimethylolethane | 120 | parts | (1.00 mol) |
| Lithium oleate | 1 | part | |
| Hexahydrophthalic anhydride | 274 | parts | (1.80 mols) |
| Xylene | 30 | parts | |

A mixture of the above composition was reacted in the same manner as in Reference Example 28.

The resin obtained (hereinafter referred to as "polyester E") had the following properties:

| | |
|---|---|
| Softening point | 71°C |
| Excess hydroxyl percentage | 24.6% |
| Acid value | 16.3 |

REFERENCE EXAMPLE 33

Preparation of polyester F

| | | | |
|---|---|---|---|
| Dimethylterephthalate | 349 | parts | (1.80 mols) |
| Neopentyl glycol | 239 | parts | (2.30 mols) |
| Glycerin | 92 | parts | (1.00 mol) |
| Lead oleate | 1 | part | |
| Isophthalic acid | 133 | parts | (0.80 mol) |
| Adipic acid | 65.6 | parts | (0.45 mol) |
| Xylene | 30 | parts | |

A mixture of the above composition was reacted exactly in the same manner as in Reference Example 28.

The resin obtained (hereinafter referred to as "polyester F") had the following properties:

| | |
|---|---|
| Softening point | 76°C |
| Excess hydroxyl percentage | 24.6% |
| Acid value | 7.4 |

REFERENCE EXAMPLE 34

Preparation of polyester G

| | | | |
|---|---|---|---|
| Isophthalic acid | 249 | parts | (1.5 mols) |
| Phthalic anhydride | 222 | parts | (1.50 mols) |
| Neopentyl glycol | 208 | parts | (2.00 mols) |
| 2,2'-bis(4-cyclohexanol)propane | 156 | parts | (0.65 mol) |
| Glycerin | 50.6 | parts | (0.55 mol) |

Into the same reactor as in Reference Example 28 was placed a mixture of the above composition and heated slowly to 240°C and kept for 2 hours. Water produced as a by-product was removed. Then 35 parts of xylene was added slowly to the reactor, and conducted in the same manner as in Reference Example 28.

The resin obtained (hereinafter referred to as "polyester G") had the following properties:

| | |
|---|---|
| Softening point | 82°C |
| Excess hydroxyl percentage | 15.8% |
| Acid value | 16.7 |

REFERENCE EXAMPLE 35

Preparation of polyester H

| | | | |
|---|---|---|---|
| Dimethylterephthalate | 427 | parts | (2.20 mols) |
| Propylene glycol | 175 | parts | (2.30 mols) |
| 1,6-Hexane glycol | 59 | parts | (0.50 mol) |
| Glycerin | 27.6 | parts | (0.30 mol) |
| Litharge | 1 | part | |
| Isophthalic acid | 132.8 | parts | (0.80 mol) |
| Xylene | 30 | parts | |

A mixture of the above composition was reacted exactly in the same manner as in Reference Example 28.

The resin obtained (hereinafter referred to as "polyester H") had the following properties:

| | |
|---|---|
| Softening point | 112°C |
| Excess hydroxyl percentage | 8.3% |
| Acid value | 7.7 |

REFERENCE EXAMPLE 36

Preparation of polyester I (Comparison example)

| | | | |
|---|---|---|---|
| Dimethylterephthalate | 223 | parts | (1.15 mols) |
| Neopentyl glycol | 208 | parts | (2.00 mols) |
| Trimethylolethane | 156 | parts | (1.30 mols) |
| Lithium oleate | 1 | part | |
| Hexahydrophthalic anhydride | 274 | parts | (1.80 mols) |
| Xylene | 30 | parts | |

A mixture of the above composition was reacted exactly in the same manner as in Reference Example 28.

The resin obtained (hereinafter referred to as "polyester I") had the following properties:

| | |
|---|---|
| Softening point | 74°C |
| Excess hydroxyl percentage | 33.9% |
| Acid value | 18.4 |

REFERENCE EXAMPLE 37

Preparation of polyester J (Comparison example)

| | | | |
|---|---|---|---|
| Dimethylterephthalate | 407 | parts | (2.10 mols) |
| Neopentyl glycol | 156 | parts | (1.50 mols) |
| 2,2'-bis(4-cyclohexanol)propane | 360 | parts | (1.50 mols) |
| Trimethylolethane | 60 | parts | (0.50 mol) |
| Lietherge | 1 | part | |
| Iosphthalic acid | 199 | parts | (1.20 mols) |
| Xylene | 35 | parts | |

A mixture of the above composition was reacted exactly in the same manner as in Reference Example 28.

The resin obtained (hereinafter referred to as "polyester J") had the following properties:

| | |
|---|---|
| Softening point | 140°C |
| Excess hydroxyl percentage | 15.0% |
| Acid value | 14.3 |

REFERENCE EXAMPLE 38

Preparation of polyester K (Comparison example)

| | | | |
|---|---|---|---|
| Dimethylterephthalate | 388 | parts | (2.0 mols) |
| Ethylene glycol | 186 | parts | (3.0 mols) |
| Trimethylolpropane | 53.6 | parts | (0.4 mol) |
| Lead oleate | 1 | part | |
| Adipic acid | 190 | parts | (1.3 mols) |

A mixture of the above composition was reacted exactly in the same manner as in Reference Example 28.

The resin obtained (hereinafter referred to as "polyester K") had the following properties:

| | |
|---|---|
| Softening point | 60°C |
| Excess hydroxyl percentage | 9.1% |
| Acid value | 14.2 |

REFERENCE EXAMPLE 39

Preparation of polyester L (Comparison example)

| | | | |
|---|---|---|---|
| Dimethylterephthalate | 582 | parts | (3 mols) |
| Exthylene glycol | 124 | parts | (2 mols) |
| 1,3-Butylene glycol | 90 | parts | (1 mol) |
| Trimethylolpropane | 53.6 | parts | (0.4 mol) |
| Lead octenoate | 1 | part | |
| Adipic acid | 43.8 | parts | (0.3 mol) |
| Xylene | 30 | parts | |

A mixture of the above composition was reacted exactly in the same manner as in Reference Example 28.

The resin obtained (hereinafter referred to as "polyester L") had the following properties:

| | |
|---|---|
| Softening point | 91°C |
| Excess hydroxyl percentage | 9.1% |
| Acid value | 2.5 |

REFERENCE EXAMPLE 40

Preparation of polyester M (Comparison example)

| | | | |
|---|---|---|---|
| Dimethylterephthalate | 271.6 | parts | (1.4 mols) |
| Ethylene glycol | 124.0 | parts | (2.0 mols) |
| 1,6-Hexane glycol | 70.8 | parts | (0.6 mol) |
| Trimethylolpropane | 73.7 | parts | (0.55 mol) |
| Lead oleate | 1.0 | part | |
| Phthalic anhydride | 207.2 | parts | (1.4 mols) |
| Adipic acid | 43.8 | parts | (0.3 mol) |
| Xylene | 30.0 | parts | |

A mixture of the above composition was reacted exactly in the same manner as in Reference Example 28.

The resin obtained (hereinafter referred to as "polyester M") had the following properties:

| | |
|---|---|
| Softening point | 83°C |
| Excess hydroxyl percentage | 10.5% |
| Acid value | 25.6 |

REFERENCE EXAMPLE 41

Preparation of polyester N (Comparison example)

| | | | |
|---|---|---|---|
| Dimethylterephthalate | 388.0 | parts | (2.0 mols) |
| Ethylene glycol | 192.2 | parts | (3.1 mols) |
| Trimethylolpropane | 26.8 | parts | (0.2 mol) |
| Lead oleate | 1 | part | |
| Phthalic anhydride | 148.0 | parts | (1.0 mol) |
| Adipic acid | 43.8 | parts | (0.3 mol) |
| Xylene | 30 | parts | |

A mixture of the above composition was reacted exactly in the same manner as in Reference Example 28.

The resin obtained (hereinafter referred to as "polyester N") had the following properties:

| | |
|---|---|
| Softening point | 95°C |
| Excess hydroxyl percentage | 3.0% |
| Acid value | 14.7 |

EXAMPLES

Each of the etherified products 1 – 27 (including the comparison samples) and one of the polyester obtained in Reference Examples were mixed together as shown in Table 3 below to obtain a composition, to which were added 50 parts of titanium dioxide pigment and 1.5 parts of ketone resin of the cyclohexane type (trade mark: "ARON KR", product of Mitsuitoatsu Co., Ltd., Japan) serving as a leveling agent. The resulting composition was uniformly mixed and melted at 100°C over a period of 20 minutes by an experimental heat roll mill having a roll diameter of 8.8 cm. Subsequently, the molten mixture was pulverized by a hammer mill into a fine powder, which was screened with a 100-mesh sieve to obtain a pigmented powder coating composition. In Table 3 Example No. 1 – 23 are Examples according to this invention, and Example No. 24 – 50 are Comparison Examples.

| Example or Comparison Example | Polyester Kind | Polyester Parts by weight | Etherified melamine Kind | Etherified melamine Parts by weight |
|---|---|---|---|---|
| Example | | | | |
| 1 | A | 90 | 1 | 10 |
| 2 | A | 90 | 2 | 10 |
| 3 | A | 90 | 3 | 10 |
| 4 | F | 90 | 4 | 10 |
| 5 | A | 90 | 5 | 10 |
| 6 | E | 95 | 7 | 5 |
| 7 | G | 85 | 8 | 15 |
| 8 | A | 80 | 9 | 20 |
| 9 | A | 90 | 4 | 10 |
| 10 | B | 90 | 1 | 15 |
| 11 | C | 90 | 1 | 7.5 |
| 12 | D | 90 | 1 | 5 |
| 13 | H | 90 | 6/10 | 5/5 |
| 14 | A | 90 | Cymel No. 300/25 | 5/5 |
| 15 | D | 90 | 23 | 10 |
| 16 | A | 95 | 24 | 10 |
| 17 | H | 80 | 25 | 10 |
| 18 | F | 90 | 23 | 20 |
| 19 | G | 90 | 23 | 15 |
| 20 | C | 90 | 23 | 7.5 |
| 21 | B | 90 | 23 | 5 |
| 22 | A | 90 | 25/27 | 5/5 |
| 23 | E | 90 | Cymel No. 300/23 | 5/5 |
| Comp. Ex. | | | | |
| 24 | A | 90 | 6 | 10 |
| 25 | A | 90 | 10 | 10 |
| 26 | A | 95 | Cymel No. 300 | 5 |
| 27 | A | 90 | Cymel No. 300 | 10 |
| 28 | A | 80 | Cymel No. 300 | 20 |
| 29 | K | 90 | 1 | 10 |
| 30 | I | 90 | 23 | 10 |
| 31 | N | 90 | 1 | 10 |
| 32 | L | 90 | 1 | 10 |
| 33 | A | 97.5 | 1 | 2.5 |
| 34 | M | 90 | 1 | 10 |
| 35 | A | 90 | 11 | 10 |
| 36 | A | 90 | 12 | 10 |
| 37 | A | 90 | 13 | 10 |
| 38 | A | 90 | 14 | 10 |
| 39 | A | 90 | 15 | 10 |
| 40 | A | 90 | 16 | 10 |
| 41 | A | 90 | 17 | 10 |
| 42 | A | 90 | 18 | 10 |
| 43 | A | 90 | 19 | 10 |
| 44 | A | 90 | 20 | 10 |
| 45 | A | 90 | 21 | 10 |
| 46 | A | 90 | 22 | 10 |
| 47 | A | 90 | 11 | 20 |
| 48 | C | 90 | 11 | 10 |
| 49 | A | 95 | 19 | 5 |

-continued Table 3

| Example or Comparison Example | Polyester Kind | Polyester Parts by weight | Etherified melamine Kind | Etherified melamine Parts by weight |
|---|---|---|---|---|
| 50 | J | 85 | 23 | 15 |

Each of the pigmented powder coating composition obtained in Examples was applied to polished steel plates, 0.8 mm in thickness, by an electrostatic coating method to stepwisely varing thicknesses. The samples were baked for 30 minutes at 180°C and 200°C respectively. These samples were used for the measurement of the thickness permitting popping. Each of the pigmented powder coating composition obtained in Examples was coated to such thickness that the coating would be about 80 $\mu$ in thickness when hardened on polished mild steel plate. The samples were baked for 30 minutes at 180°C and 200°C respectively. These samples were used for the determination of the properties of the coating films. The results are given in Table 4.

The tests and evaluations listed in Table 4 were made according to the following methods:

Solvent-insolubles:

An unpigmented powder coating composition prepared by the method shown as below was applied to a glass plate to a thickness of 2 mm by a knife coater and the coated plate was baked at a specified temperature (given in Table 4) for 30 minutes. About 0.5 g of the coating film thus cured was peeled off, placed in a cylindrical filter paper No. 5A (Toyo filter Paper Company Limited., Japan) with acetone as an extracting solvent and subjected to extraction for 10 hours by an extractor. The resulting residue was thereafter dried at 60°C to a constant weight with a vacuum drier. The weight of the cured coating film was measured before and after extraction to calculate the amount of solvent insolubles (in percentage) from the following equation. The result is given in Table 4.

$$\text{Solvent-insolubles}(\%) = \frac{(B+C)-D}{A} \times 100$$

Table 4

| Sample No. | Solvent-insolubles (%) 180°C | Solvent-insolubles (%) 200°C | Popping film[1] thickness ($\mu$) 180°C | Popping film[1] thickness ($\mu$) 200°C | Gloss value 180°C | Gloss value 200°C | Resistance to gasoline 180°C | Resistance to gasoline 200°C | Erichsen test (mm) 180°C | Erichsen test (mm) 200°C | Resistance of coating Comp. to blocking |
|---|---|---|---|---|---|---|---|---|---|---|---|
| 1 | 80.1 | 92.2 | 160 | 145 | 93 | 94 | 2B | B | 7 | >7 | Good |
| 2 | 82.3 | 95.3 | 155 | 140 | 91 | 90 | 2B | B | >7 | >7 | " |
| 3 | 80.5 | 91.8 | 155 | 140 | 95 | 92 | 2B | B | 6.5 | >7 | " |
| 4 | 81.6 | 94.3 | 160 | 140 | 92 | 93 | 2B | B | >7 | >7 | " |
| 5 | 78.6 | 89.5 | 130 | 115 | 96 | 94 | 3B | B | 6.0 | >7 | " |
| 6 | 84.1 | 96.2 | 165 | 145 | 92 | 91 | 2B | HB | >7 | >7 | " |
| 7 | 82.7 | 94.4 | 160 | 140 | 94 | 94 | 2B | B | >7 | >7 | " |
| 8 | 80.9 | 92.7 | 145 | 125 | 91 | 90 | 2B | B | 6.7 | >7 | " |
| 9 | 85.2 | 96.8 | 135 | 120 | 90 | 91 | 2B | B | >7 | >7 | " |
| 10 | 83.8 | 94.1 | 150 | 130 | 92 | 92 | 2B | B | >7 | >7 | " |
| 11 | 79.3 | 90.0 | 150 | 135 | 96 | 93 | 3B | B | 6.2 | >7 | " |
| 12 | 78.6 | 90.2 | 170 | 150 | 93 | 92 | 3B | B | 5.8 | >7 | " |
| 13 | 81.4 | 93.8 | 165 | 145 | 95 | 94 | 2B | B | 7 | >7 | " |
| 14 | 80.6 | 92.2 | 150 | 130 | 96 | 95 | 3B | B | 7 | >7 | " |
| 15 | 78.5 | 94.3 | 160 | 140 | 95 | 93 | 2B | F | 7 | >7 | " |
| 16 | 75.5 | 93.3 | 155 | 140 | 93 | 92 | 2B | F | 7 | >7 | " |
| 17 | 78.1 | 92.8 | 155 | 140 | 93 | 93 | B | F | 6.5 | >7 | " |
| 18 | 82.3 | 96.6 | 135 | 120 | 90 | 91 | 2B | F | <7 | >7 | " |
| 19 | 80.0 | 95.3 | 150 | 130 | 92 | 92 | 2B | F | <7 | >7 | " |
| 20 | 73.3 | 91.1 | 160 | 140 | 96 | 92 | 2B | HB | 6.5 | >7 | " |
| 21 | 78.0 | 90.8 | 165 | 150 | 93 | 91 | 3B | B | 6.0 | >7 | " |
| 22 | 77.7 | 93.2 | 160 | 140 | 95 | 93 | 2B | HB | 7 | >7 | " |
| 23 | 80.2 | 92.7 | 150 | 135 | 95 | 94 | 3B | B | 6.5 | 1.5 | " |
| 24 | 83.2 | 95.0 | 155 | 135 | 93 | 92 | B | F | 7 | >7 | Poor |
| 25 | 62.3 | 77.2 | 135 | 115 | 92 | 93 | <6B | 5B | 0.3 | 1.5 | Good |
| 26 | 55.6 | 70.1 | 110 | 75 | 83 | 61 | <6B | 5B | 0.2 | 0.6 | " |
| 27 | 60.2 | 75.3 | 75 | 55 | 64 | 40 | <6B | 5B | 0.4 | 0.8 | " |
| 28 | 70.6 | 81.6 | 50 | <40 | 52 | 36 | 3B | B | 0.7 | 2.1 | " |
| 29 | 78.5 | 89.2 | 145 | 155 | 93 | 91 | 3B | 2B | 6.5 | 7 | Poor |
| 30 | 84.6 | 95.3 | <40 | <40 | 38 | 21 | HB | H | 7 | 5.7 | Good |
| 31 | 54.5 | 74.6 | 155 | 130 | 93 | 92 | <6B | 5B | 0.4 | 1.1 | " |
| 32 | 53.7 | 70.6 | 155 | 135 | 91 | 90 | <6B | 6B | 0.2 | 0.6 | " |
| 33 | 55.1 | 67.2 | 160 | 150 | 96 | 94 | <6B | 5B | 0.3 | 0.9 | " |
| 34 | 85.1 | 94.1 | 60 | 50 | 51 | 42 | B | HB | >7 | >7 | " |
| 35 | 61.7 | 79.2 | 80 | 60 | 85 | 61 | <6B | 5B | 0.5 | 1.0 | " |
| 36 | 60.8 | 77.4 | 85 | 60 | 92 | 58 | <6B | 5B | 0.4 | 0.8 | " |
| 37 | 62.3 | 78.4 | 90 | 65 | 91 | 63 | <6B | 5B | 0.5 | 0.9 | " |
| 38 | 61.9 | 81.4 | 110 | 75 | 92 | 85 | <6B | 6B | 0.3 | 1.1 | " |
| 39 | 62.1 | 78.1 | 95 | 65 | 93 | 87 | <6B | 5B | 0.6 | 0.9 | " |
| 40 | 63.4 | 79.1 | 100 | 70 | 94 | 88 | <6B | 6B | 0.7 | 0.9 | " |
| 41 | 62.5 | 78.1 | 100 | 65 | 92 | 81 | <6B | 6B | 0.6 | 0.9 | " |
| 42 | 63.2 | 77.1 | 110 | 80 | 92 | 91 | <6B | 6B | 0.7 | 0.9 | " |
| 43 | 63.8 | 80.1 | 125 | 95 | 93 | 94 | <6B | <6B | 0.6 | 1.2 | Poor |
| 44 | 61.4 | 79.4 | 155 | 120 | 94 | 93 | <6B | <6B | 0.5 | 1.5 | " |
| 45 | 60.4 | 78.6 | 135 | 105 | 96 | 93 | <6B | <6B | 0.5 | 1.2 | " |
| 46 | 59.3 | 79.1 | 165 | 130 | 90 | 87 | <6B | <6B | 0.4 | 1.6 | " |
| 47 | 76.2 | 85.5 | 60 | <40 | 64 | 48 | 6B | 0.7 | 3.6 | Good | |
| 48 | 61.4 | 78.8 | 90 | 65 | 93 | 75 | <6B | 6B | 0.3 | 0.9 | " |
| 49 | 57.2 | 72.4 | 150 | 125 | 94 | 91 | <6B | <6B | 0.2 | 0.7 | Poor |
| 50 | 81.3 | 92.6 | 70 | 55 | 62 | 51 | B | HB | 6.5 | 7.0 | Good |

Note: [1] Maximum coating film thickness which is observed no popping, the same as hereinafter.

wherein A is weight of sample before extraction, B is weight of filter paper after extraction, C is weight of sample after extraction and D is weight of filter paper.

The above unpigmented powder coating composition was prepared as follow:

Each of the etherified products 1 - 27 and one of the polyester obtained in Reference Examples were mixed together as shown in Table 3 above to obtained a composition, to which was added 1.5 parts of the leveling agent ("ARON KR"). The resulting composition was conducted in the same manner as in Examples.

Erichsen test:
Conducted according to JIS–Z–2247. The greater the numerical value listed, the higher is the flexibility.

Gloss value:
According to JIS-K-5400, 6.7.

Resistance to gasoline:
The test plate was immersed in gasoline at 20°C for 24 hours and then taken out, whereupon the pencil hardness of the immersed portion was measured at 20°C according to JIS-K-5400, 6.14. The higher the pencil hardness, the better is the resistance to solvent.

Resistance of coating composition to blocking: 5.0 g of the pigment powder coating composition obtained in Example was placed into a test tube of 10 mm in diameter and left to stand at 40°C for 24 hours. If the sample returned to the original fine powder state when thereafter taken out of the tube, it was evaluated as "good". If the resistance to blocking is good, the particles of the powder will not fuse during storage.

What we claim is:

1. Powder coating composition comprising in powder form 4 to 20% by weight of a hexamethylolmelamine derivative and 96 to 80% by weight of a polyester having a softening point of 65° to 130°C, an acid value of 5 to 20 and an excess hydroxyl percentage of 5 to 30%, said hexamethylolmelamine derivative being at least one of etherified products of hexamethylolmelamine which have CH₃O— and RO— groups substituted for the hydroxyl group in the methylol group of hexamethylolmelamine, the average total number of the CH₃O— and RO— groups being 5.5 to 6.0 per melamine nucleus, the average number of the RO— group being 0.5 to 3.0 per malamine nucleus, wherein RO is

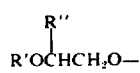

group or

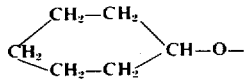

group, R' being an alkyl group having 1 to 4 carbon atoms and R" being hydrogen atom or methyl group; said polyester being polycondensation product of polycarboxylic acid with polyhydric alcohol wherein said polycarboxylic acid is at least one member selected from the group consisting of benzene-1,2,4-tricarboxylic acid, phthalic acid, tetrahydrophthalic acid, hexahydrophthalic acid, endobicyclo-2,2,1-5-heptyne-2, 3-dicarboxylic acid, tetrachlorophthalic acid, succinic acid, isophthalic acid, terephthalic acid, azelaic acid, adipic acid, sebacic acid, anhydrides of such acids and alkyl esters thereof; and said polyhydric alcohol being at least one member selected from the group consisting of glycerin, trimethylolpropane, trimethylolethane, trishydroxyethyliso-cyanurate, pentaerythritol, ethylene glycol, diethylene glycol, propylene glycol, trimethylene glycol, 1,3-, 1,2- and 1,4- butanediols, heptanediol, hexanediol, octanediol, 2,2′-bis(4-cyclohexanol) propane, neopentyl glycol, and 2,2,3-trimethylpentane-1, 3-diol.

2. The powder coating composition according to claim 1, in which said RO— group is

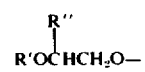

group.

3. The powder coating composition according to claim 2, in which said

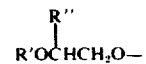

group is R′OCH₂CH₂O— group.

4. The powder coating composition according to claim 3, in which R′OCH₂CH₂O— group is CH₃OCH₂CH₂O— group.

5. The powder coating composition according to claim 1, in which said RO— group is

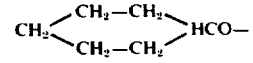

group.

6. The powder coating composition according to claim 1, in which said average number of the RO— group is 1.0 to 3.0 per melamine nucleus.

7. The powder coating composition according to claim 1, in which said polyester has a softening point of 65° to 115°C, an acid value of 6 to 18 and an excess hydroxyl percentage of 8 to 25%.

8. The powder coating composition according to claim 1, in which said composition comprises 5 to 15% by weight of the hexamethylolmelamine derivative and 95 to 85% by weight of the polyester.

9. The powder coating composition according to claim 1, in which said composition further contains a pigment.

10. An article coated with a coating film obtained from the powder coating composition in claim 1.

* * * * *